United States Patent [19]

Flider

[11] 3,770,160
[45] Nov. 6, 1973

[54] SAFETY DISPOSAL CAN FOR INFLAMMABLE MATERIALS

[75] Inventor: Frank S. Flider, Chicago, Ill.

[73] Assignee: The Justrite Manufacturing Company, Chicago, Ill.

[22] Filed: June 9, 1971

[21] Appl. No.: 151,354

Related U.S. Application Data

[63] Continuation-in-part of Ser. No. 98,557, Dec. 16, 1970.

[52] U.S. Cl. ............... 220/36, 217/60 R, 217/60 E, 220/70, 220/88 A, 222/469, 222/473
[51] Int. Cl. ............................................ B65d 43/16
[58] Field of Search ................ 220/36, 88 A, 55.3, 220/55.7, 70, 23, 8, 23.83, 23.86; 215/1 C; 217/60 R, 60 B–60 G; 222/469, 473

[56] References Cited
UNITED STATES PATENTS

| | | | |
|---|---|---|---|
| 242,962 | 6/1881 | Newton | 220/88 A |
| 1,266,665 | 5/1918 | Davis | 220/88 A |
| 1,689,057 | 10/1928 | Schwemlein | 220/36 |
| 2,574,876 | 11/1951 | Lebus | 220/36 X |
| 2,624,493 | 1/1953 | Porter | 220/36 X |
| 2,678,758 | 5/1954 | Richmond, Sr. | 220/36 X |
| 2,748,997 | 6/1956 | Richmond, Sr. | 220/36 X |
| 3,100,576 | 8/1963 | Frank | 215/1 C |
| 3,101,856 | 8/1963 | Whiteman, Jr. | 215/1 C |
| 3,469,747 | 9/1969 | Richmond, Jr. | 222/469 |

FOREIGN PATENTS OR APPLICATIONS

| | | | |
|---|---|---|---|
| 161,984 | 3/1955 | Australia | 220/36 |
| 625,781 | 7/1949 | Great Britain | 220/36 |
| 743,656 | 1/1956 | Great Britain | 220/70 |
| 1,213,528 | 11/1970 | Great Britain | 215/1 C |

Primary Examiner—Herbert F. Ross
Assistant Examiner—James R. Garrett
Attorney—Alter, Weiss & Whitesel

[57] ABSTRACT

A completely enclosed plastic can or container has a large mouth opening, closed by a cap under the pull of a substantial spring bias. The cap may be secured in an open position against the pull of the bias spring. The cap is selectively controlled by a handle and linkage connected to a vertical fin formed on the can, preferably by an enlargement of the parting or flash line between two mold parts. Preferably, the container is made by a blow molding process.

12 Claims. 8 Drawing Figures

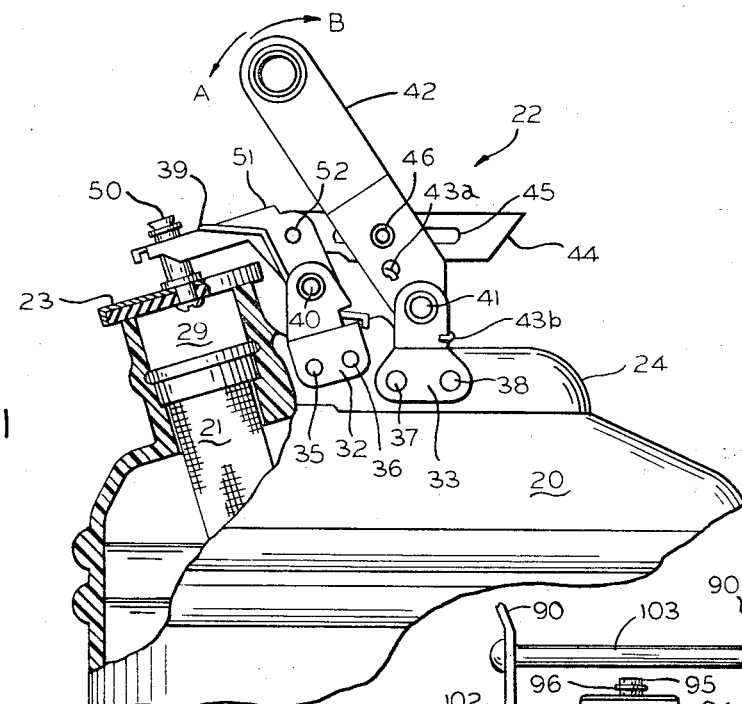
FIG.1
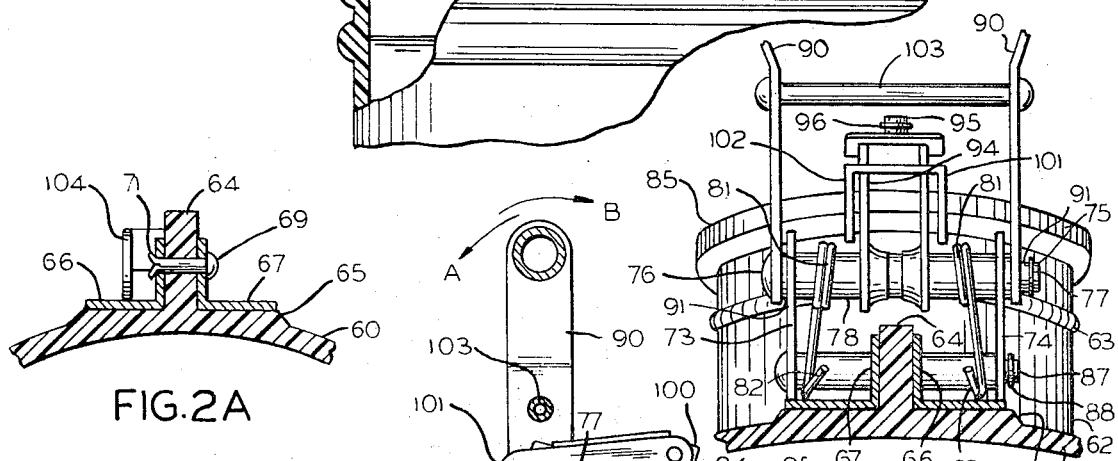
FIG.2A
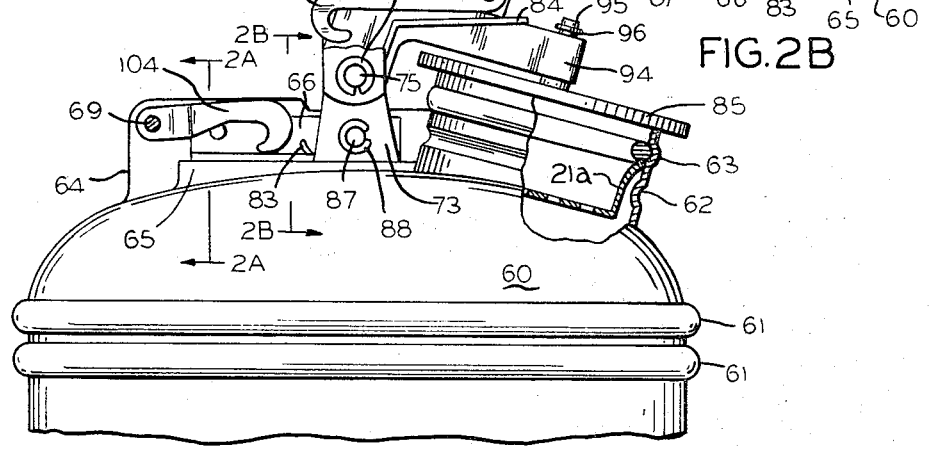
FIG.2B
FIG.2
INVENTOR
FRANK S. FLIDER
BY
Alter, Weiss and Whitesel
ATTORNEYS

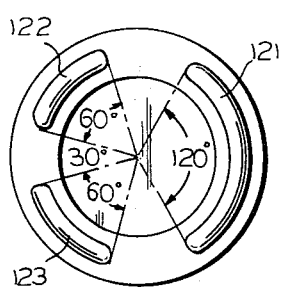
FIG.5
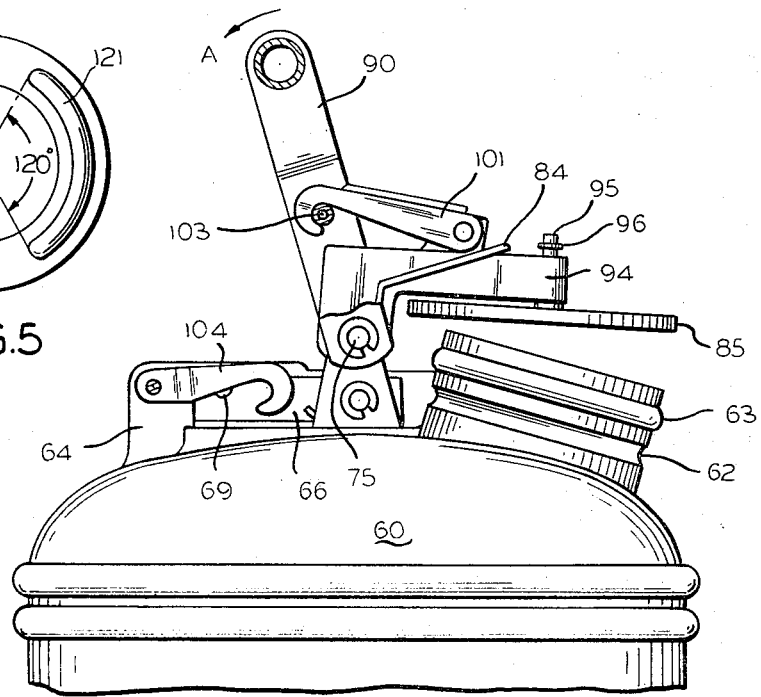
FIG.3
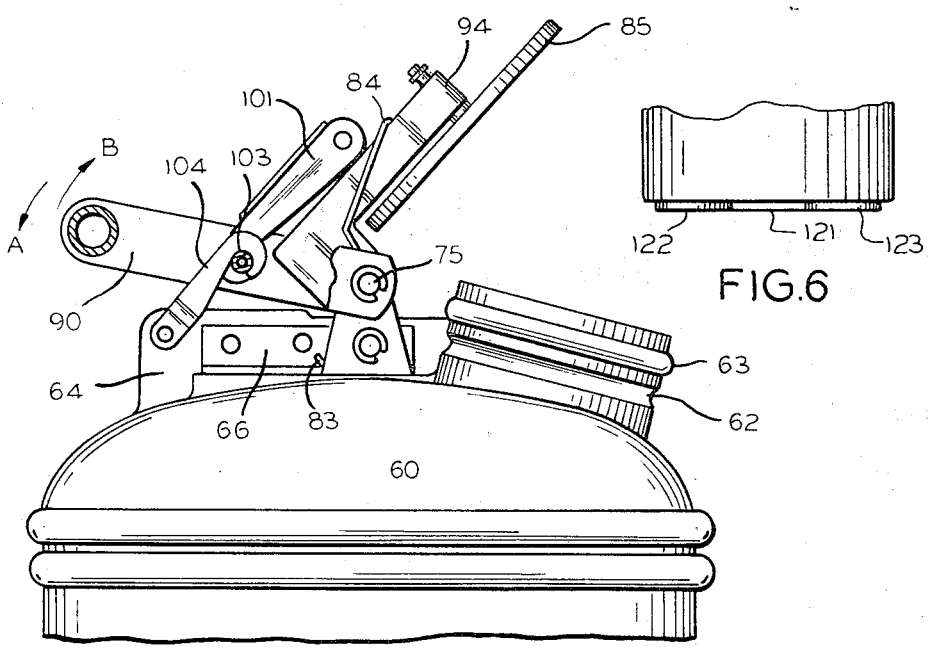
FIG.4
FIG.6
INVENTOR
FRANK S. FLIDER
BY
Alter, Weiss and Whitesel
ATTORNEYS

SAFETY DISPOSAL CAN FOR INFLAMMABLE MATERIALS

This is a continuation-in-part of my earlier invention entitled "Safety Container for Inflammables With Clip-On Spout", Ser. No. 98,557, filed Dec. 16, 1970 and assigned to the assignee of this invention.

This invention relates to new an improved plastic disposal cans of containers, and especially — although not exclusively — to containers for discarded inflammable materials.

Containers for discarded inflammable materials (such as used chemicals and solvents) are not only known in the art, but also have very carefully prescribed safety regulations which are often enforced by governmental and industrial agencies. Thus, an improved disposal container must have a better design than the other containers which are already on the market. Also, the improved container must meet or exceed these and other existing safety regulations. Finally, these containers must have a sales appeal for the buying public, which goes beyond the sales appeal of previously available disposal cans.

Previously, cans have generally been made of a heavy gauge steel material, such as 24-gauge Terne plate. Reinforcing ribs have sometimes been formed to add strength. Seams have been folded and crimped to provide four or five thicknesses of metal locked together by double seaming. Preferably, the container has been dipped in a hot lead or tin bath to provide a corrosion protection. Then, a fine quality of enamel was baked on over the tin coating.

These disposal cans are often designed with self-closing caps or lids for insuring a closure of the container while it is storing waste, inflammable oil, solvents, and the like. It is desirable to be able to prop open these self-closing caps or lids while material is being placed in the can. Likewise, it is also desirable to provide a means whereby the disposal cans may be carried about without any danger that the cap or lid might open.

The disposal cans have usually included ferrous materials which may corrode and create hazardous "sparks" responsive to an accidental contact with other ferrous materials. Moreover, the metal disposal cans are frequently bumped when they are being transported or used. This bumping sometimes distorts the shape of the can so that it is no longer resistant to the leaking of fresh air and cannot prevent the sustaining of a fire. All of these disadvantages are overcome by the use of a non-conductive, non-metallic assembly incorporating the features of the invention.

Accordingly, an object of the invention is to provide a new and improved plastic disposal cans with spring biased means for closing the cans under substantial force. Here, an object is to provide a spring biased cap which may be propped open under some conditions and completely disengaged under other conditions. In this connection, an object is to provide a disposal can with may be easily carried about without any risk that the cap might open.

In keeping with an aspect of the invention, these and other objects are accomplished by an all plastic disposal can with a spring biased cap. The can has a handle linkage attached to a vertical fin upstanding on the surface of the can and formed by a thickened flash at the parting line where two mold halves come together. Also, attached to the fin is a hook for engaging the handle and propping or holding the cap open against the bias of the spring. Another hook running between the cap and the handle may be engaged or disengaged in order to enable the cap to be opened or preclude it from opening.

The nature of a preferred embodiment of the invention for accomplishing these and other objects may be understood best from a study of the following description and the attached drawing in which:

FIG. 1 is an elevation side view (partly in cross section) of my prior plastic safety can using a plastic fin for supporting a handle linkage, the present application being a continuation-in-part of an application on this prior can;

FIG. 2 is a side elevation view of the disposal can with the handle disengaged from the cap control linkage;

FIGS. 2A and 2B are first and second cross sectional views of the fin taken along lines 2A—2A and 2B—2B, respectively, of FIG. 2;

FIG. 3 is an elevation side view of the disposal can with the cap control linkage engaging the handle;

FIG. 4 is a side elevation view of the disposal can with the cap propped open in a resting position; and FIGS. 5 and 6 are bottom plan view and a fragmentary side view of the supporting feet for the inventive can.

The principal elements in FIG. 1 are an all plastic can 20, a filter screen arrangement 21, and a handle and linkage cap control arrangement 22. The handle and linkage automatically open a normally closed cap 23 when the can is tipped and closes the cap when the can is at rest.

The can 20 is all plastic and formed by any suitable means —such as blow molding inside a mold cavity. The mold (not shown) includes two pieceparts which come together in a good fit. The flash or parting line where the mold parts join is thickened on the top to form an upstanding fin or rib 24 which is integral with, and strengthens and supports the neck. The fin or rib is designed to have a strength adequate to support the handle and linkage mechanism 22 without distortion of the plastic. A series of holes are molded into the plastic fin 24 in order to provide a means for attaching the handle and linkage 22 to the can without piercing the walls thereof.

The can 20 has an integral opening or vent 29—shaped somewhat as the neck of a bottom—which enalbes fluid to be poured into or out of the container 20. The neck-like opening 29 is covered by the safety cap 23 which opens for filling or pouring. The safety cap 23 is controlled by the handle and linkage 22, mounted on saddle brackets 32 and 33 attached to the rib 24 by means of rivets 35–38. The cap is spring loaded to a closed position by a spring 39 which wraps around a pin 40 in bracket 32 and bears down on top of the cap 23 with a predetermined pressure to vent the vapor pressure inside the can when it exceeds, say 5 p.s.i.

The handle and linkage arrangement 22 are mounted on the saddle bracket 33 attached to the top of the can 20, in approximately the center of gravity. Pivotally mounted on bracket 33, at the point 41, is a handle 42 having a spring 43a, 43b normally urging the handle 42 to swing in the direction A toward a low profile position when the container 20 is not in use. A horizontal linkage comprises a bar 44 having a longitudinal slot 45 therein. Thus, if the handle 42 is raised, there is a lost motion as the pin 46 moves through the length of the slot 45, before any linkage action occurs. This amount of movement allows the user to secure a comfortable grip before lifting the weight of the can.

Attached to the cap 23 and forming part therof is a pin or bracket 50 which is loosely connected to an L-shaped cover bracket assembly 51 pivotally connected to the saddle mounting 32 by the pin 40. The angle point of the L-shaped bracket is connected to the bar 44 by means of a pin 52. When the handle 42 moves in direction B, pin 46 encounters the end of slot 45 to pull bracket 51 with a sufficient force to open the cap 23, against the force of the spring 39.

It should now be apparent that, when the handle 42 is lifted, it moves to an upright position without producing any effect upon the cap 23. When the bottom of the can 20 is thereafter lifted to a pouring position, pin 46 pulls back on the end of the slot 45 and, in turn, pulls against pin 52 to rock the bracket 51 about the pivot point 40. The pin 50 is lifted by the end of bracket 51, and the cap 23 opens. When the can is set down, the reverse action takes place, and the cap 23 closes while the handle 42 moves forward to its low profile position.

The disposal can, constructed according to the invention is seen in FIGS. 2–4. More particularly, a closed, all plastic safety can 60 has a dome-shaped top with reinforcing ribs 61 circumferentially disposed at the bottom of the dome. At the top of the dome, the can opens in a neck-like cylinder 62 which is large enough for easy passage of inflammable materials. One or more suitable reinforcing rings surround the neck to strengthen it. A flame arrester screen 21a is captured and supported inside the neck by the internal contours of the reinforcing ring 63. preferably the arrester is in the form of a cup having a perforated metal bottom.

Extending from and integral with the neck 62 is an upstanding fin 64 projecting away from and formed in the plastic of the can 60. The fin 64 has substantial vertical strength. The base of the fin 64 is a widened platform 65 giving further horizontal strength to the fin and further vertical strength to the dome-shaped top of the can 60.

A pair of elongated, metal brackets 66, 67, having an L-shaped cross section, are positioned on either side of the fin 64 to strengthen and stabilize it. Any suitable means may be used to attach the brackets to the fin. For example, rivets 69 may be passed through both brackets and the fin, and then swaged at 71 to mushroom and secure the brackets in place.

The outside edge of the brackets 66, 67 have integral upstanding ears 73, 74 forming load bearing areas fo receiving a horizontal pin 75 having a lead 76 on one end and a retaining "C" washer 77 on the other end. A suitable cylindrical spacer 78 loosely fits over pin 75 and extends between the ears 73, 74 to provide a rotatable handle support means. A coiled spring 81 with substantial force (about 20 pounds pull) wraps around the spacer 78. Two ends 82, 83 of the coiled spring 81 rest on the horizontal plate of the brackets 66 and 67. The central part 84 of the coiled spring applies a substantial downward pressure (about 20 pounds) to close a cap 85 over the open end of the neck 62. A second spacer and connector bar 87 runs between the upstanding ears 73, 74 and is secured in place by a C-washer 88.

At the vertical center of gravity, a handle 90 is rotatably attached at 91 to the pin 75 on the sides of the ears 73, 74. thus, the handle 90 may swing freely in either direction A or B. In this manner, the disposal can may be easily picked up and carried about while the spring 84 firmly holds the cap in position, closing the top of the can. A suitable gasket (not shown) is fitted inside the cap 85.

An L-shaped bracket 94 is rigidly attached to the cylindrical spacer 78. Therefore, the bracket 94 may pivot about pin 75, subject to the closing force of the spring 84. A pin 95, rigidly attached to cap 85, runs upwardly through a hole at the end of the bracket 94. A C-washer 96 fits over the end of the pin 95 and locks the assembly together.

Means are provided for selectively controlling the opening and closing of the cap 85. More particularly, a support bracket 100 is formed in or attached to the top of the L-shaped bracket 94, for receiving a first or opening connector means. As here shown, a preferred connector comprises a pair of hooks 101, 102 which may be made from a single piece of sheet metal stamped on a punch press and folded into a somewhat U-shaped cross section. A post 103 runs horizontally between the two vertical handle brackets 90, 90 at a vertical position where it may be engaged or captured by the hooks 101, 102. Attached to the plastic fin 64 is another control means in the form of hook 104, also positioned to engage the horizontal bar 103.

The operation of the disposed can 60 will become more apparent from a study and comparison of FIGS. 2, 3, and 4. More particularly, to carry the can (FIG. 2), with the cap 85 closed, all of the hooks 101, 102, 104 are disengaged from the bar 103. The can may be picked up by the handle 90 and carried about while the cap 85 is held closed by the spring 84.

To open the can, the hooks 101, 102 are lifted and the handle 90 is moved forward in the direction B until the hooks fit over and engage the bar 103 (FIG. 3). Then the handle 90 is moved back in direction A. The hooks 101, 102 form a linkage for transmitting the pulling force from handle 90 to the L-shaped bracket 94, thereby lifting the cap 85. If the user wishes to discard oil or the like, he need only push on the handle 90 to raise the cap 85. After the inflammable material is deposited in the can, the handle 90 is released, and spring 84 automatically closes the cap 85.

If there if a substantial amount of material to discard, or if the can is to be emptied, it may be desirable to prop the cap open for an extended period of time (FIG. 4). For this purpose, the handle 90 is pressed downwardly in direction A, as far as it will go. Then, the hook 104 is placed over the bar, and the handle 90 is released. The force of spring 84, pressing downwardly on bracket 94, causes the handle 90 to raise in direction B until restrained by hook 104 engaging the bar 103. To release the cap, handle 90 is again pushed downward in direction A, the hook 104 is lifted back, away from engagement with bar 103. When the handle 90 is thereafter released, the cap is closed by the spring 84.

The inventive can often sets in uneven areas where there are rocks, holes, or a bumpy floor. Therefore, a circular flat bottom or a conventional four point support is less desirable than a three point tripod support. Hence, the bottom of the can is preferably molded with three feet 120, 121, 122 for evenly distributing the weight of the can. To improve the stability of the can, one of the feet 121 is preferably made approximately twice as large as each of the other two feet 122, 123. For example, in one can, it was found that good support was achieved when the larger foot 121 sustended an arc of approximately 100° to 120° and each of the smaller feet, 122, 123 sustended an arc of about 45° t0 60°. Preferably the larger foot 121 is vertically aligned under the neck opening. The separation between the two smaller feet 122, 123 was about 30° to 40°. It should be understood, however, that other equally satisfactory spacings may be provided on other cans.

The invention provides many advantages which should now be apparent. First, all plastic can has a low cost, is modern in appearance, and attractive in use. The plastic container improves the operation and durability of the disposal can through easier removal of waste, greater strength, and flexibility against knocks, and dents, and cooler handling. It is made in one piece of new, advanced quality linear high-density polyethylene. Second, the method of hardware attachment to the fin makes a good, strong, and durable connection without piercing the wall of the container. Third, the metal parts may be dip coated with a suitable plastic material to preclude exposure of bare metal surfaces which may corrode, rust, or generate sparks. Fourth, the all metal cans used heretofore were subject to excessive pounding, sometimes with a result that the metal container might be pierced or broken and rendered useless (having lost its gas-tight property). Also, denting of the container from such excessive pounding is undesirable from the appearance viewpoint.

the foregoing has spoken of the inventive device as a "disposal can." However, it should be understood that the invention provides a safe way to handle any flammable materials. The cans may be inspected and individually labeled and numbered according to the requirements of governmental or industrial organizations. Thus, the can serves an essential need wherever waste, oil, solvents and other liquids are used. It protects flammable materials from fire-making sparks, smoker carelessness, and from self ignition. The can remains closed when not in use, and closes automatically when released. The round construction of the cans encourages constant circulation of air around can.

Still other advantages will readily occur to those who are skilled in the art.

I claim:

1. A safety disposal can comprising a container formed of a plastics material and having a completely and continuously closed and unbroken inner surface on the walls thereof and with said inner surface being free of all attachments thereto,
    said inner surface terminating at a neck-like opening forming a communicating passageway through a wall of said container to receive waste material placed in said container and for emptying said container after it is filled with waste material,
    the outside surface of said wall of said container being formed with a thickened fin resting on a raised platform,
    said fin projecting outwardly away from said outside surface of said raised platform container to give added strength to the container in a plane substantially perpendicular to the surface of said container, and said platform giving added strength to the surface of said container wall in a plane normal to said fin,
    said fin and said platform abutting and supporting said neck-like opening.
    attachment means fitting against said fin and said platform for securing a separate structure to the outside surface of said container, and
    means for attaching said attachment means to said fin without breaking through said inner surface of the container.

2. The safety disposal can of claim 1 wherein said thickened fin and raised platform are formed along a parting line produced by the multiple part mold used in forming the container.

3. The safety disposal can of claim 1 wherein said separate structure is a handle mounted in vertical alignment with the center of gravity of said container,
    a spring biased cap for normally closing said opening, and
    means responsive to movement of said handle for selectively controlling the opening and closing of said cap.

4. The can of claim 1 and a metal fire arrester means suspended and locked inside said passageway.

5. The can of claim 1 wherein said neck-like opening comprises an internal annular capture member formed therein, and a cup-like fire arrester means suspended and locked inside said opening, said cup having a perforated bottom.

6. The can of claim 1 wherein the bottom of said can has three integral dependent feet molded therein, wherein one of said feet is approximately twice as long as each of the other two feet.

7. The can of claim 6 wherein said long foot is positioned under said opening.

8. A safety disposal can comprising a container formed of a plastics material and having a completely and continuously unbroken inner surface on the walls thereof free of all attachments thereto,
    said inner surface terminating at an opening forming a communicating passageway through a wall of said container to receive waste material placed in said container and for emptying said container after it is filled with waste material,
    the outside surface of said wall of said container being formed with a thickened fin thereon projecting outwardly from the wall,
    attachment means fitted against said fin for securing a separate structure to the outside of said container,
    means for attaching said attachment means to said fin without breaking through said inner surface of the container,
    said separate structure comprising a handle mounted in vertical alignment with the center of gravity of said container, a hinged spring bias cap for normally closing said opening, means responsive to the movement of said handle for selectively controlling the opening and closing of said cap,
    said means for attaching said attachment means to said fin comprising an elongated bracket with an L-shaped cross-section attached to each side of said fin by means of metal fasteners passing through the brackets and the fin, said bracket supporting, at least, said handle, and
    selectively controllable linkage means for engaging said handle for opening said container when said handle is moved to a predetermined position.

9. The safety disposal can of claim 8 wherein said controllable linkage comprises an elongated means which may be selectively attached between said cap and said handle whereby movement of said handle opens said cap when said linkage is connected.

10. The safety disposal can of claim 9 and another of said controllable linkage is an elongated means selectively connected between said fin and said handle, to hold said handle and said cap, when said cap is in an open position.

11. The safety disposal can of claim 10 wherein each of said elongated means comprises a hook and said handle has a pin for capturing said hook.

12. The safety can of claim 11 wherein at least some of the metal parts attached to said fin are plastic coated.

* * * * *